(12) United States Patent
Fitzgibbons, Jr.

(10) Patent No.: US 7,273,634 B2
(45) Date of Patent: *Sep. 25, 2007

(54) COATINGS AND ADDITIVES CONTAINING CERAMIC MATERIAL

(76) Inventor: Robert T. Fitzgibbons, Jr., 114 Victory Ave., Lackawanna, NY (US) 14218

( * ) Notice: Subject to any disclaimer, the term of this patent is extended or adjusted under 35 U.S.C. 154(b) by 531 days.

This patent is subject to a terminal disclaimer.

(21) Appl. No.: 10/344,356

(22) PCT Filed: Jul. 22, 2002

(86) PCT No.: PCT/US02/23485

§ 371 (c)(1),
(2), (4) Date: Feb. 10, 2003

(87) PCT Pub. No.: WO2004/009511

PCT Pub. Date: Jan. 29, 2004

(65) Prior Publication Data

US 2006/0037277 A1 Feb. 23, 2006

Related U.S. Application Data

(63) Continuation-in-part of application No. 09/503,829, filed on Feb. 15, 2000, now Pat. No. 6,423,129.

(60) Provisional application No. 60/159,669, filed on Oct. 15, 1999.

(51) Int. Cl.
*B05D 1/12* (2006.01)
(52) U.S. Cl. ........................ 427/202; 427/186; 427/204; 427/205
(58) Field of Classification Search ................ 427/186, 427/202, 204, 205
See application file for complete search history.

(56) References Cited

U.S. PATENT DOCUMENTS

| 3,100,154 A | 8/1963 | Oshima et al. |
| 3,634,068 A | 1/1972 | Foard |
| 4,095,985 A | 6/1978 | Brown |

(Continued)

FOREIGN PATENT DOCUMENTS

CN 1274735 11/2000

(Continued)

OTHER PUBLICATIONS

S. Barter, "How the World Trade Center Fell," BBC News (on line edition in World: Americas section at http://news.bbc.uk), Sep. 13, 2001, 5 printed pages.
R. Lewis, Sr., Hawley's Condensed Chemical Dictionary, 13th ed., Van Nostrand Reinhold, 1997, pp. 230, 293.

*Primary Examiner*—Fred J. Parker
(74) *Attorney, Agent, or Firm*—James C. Simmons

(57) ABSTRACT

A coating for support beams in buildings to protect their structural integrity in case of high heat events, for roofs and the like to inexpensively provide protection from ultraviolet light, for wood or steel substrates to inexpensively provide flame or chemical resistance respectively, and for protection of various other building substrates. The coating comprises an adhesive and a recycled ceramic powder and may also comprise a recycled granular ceramic material. An additive to sealants, caulking, and other construction materials to inexpensively provide improved fire resistance and insulation and other enhanced properties. The additive comprises a recycled ceramic powder and may also comprise a recycled granular ceramic material.

19 Claims, 2 Drawing Sheets

U.S. PATENT DOCUMENTS

| | | | |
|---|---|---|---|
| 4,193,240 A | 3/1980 | Odoerfer | |
| 4,292,220 A * | 9/1981 | Novak et al. | 524/555 |
| 4,304,605 A | 12/1981 | Keibler | |
| 4,904,709 A * | 2/1990 | Hermele | 523/220 |
| 4,955,171 A | 9/1990 | Kossatz et al. | |
| 5,066,330 A | 11/1991 | Holcombe, Jr. et al. | |
| 5,636,481 A | 6/1997 | De Zen | |
| 5,891,239 A * | 4/1999 | Costa | 106/735 |
| 6,284,689 B1 | 9/2001 | Strawbridge | |
| 6,423,129 B1 * | 7/2002 | Fitzgibbons, Jr. | 106/287.35 |
| 6,641,896 B2 | 11/2003 | Fensel et al. | |
| 6,933,007 B2 | 8/2005 | Fensel et al. | |
| 2002/0081924 A1 | 6/2002 | Fensel et al. | |
| 2003/0152747 A1 | 8/2003 | Fensel et al. | |
| 2003/0198736 A1 | 10/2003 | Fensel et al. | |
| 2004/0071938 A1 | 4/2004 | Fensel et al. | |
| 2005/0238848 A1 | 10/2005 | Fensel et al. | |

FOREIGN PATENT DOCUMENTS

| | | |
|---|---|---|
| DK | 5673 | 5/1903 |
| EP | 0257588 | 3/1998 |
| EP | 0857703 A2 | 8/1998 |
| JP | 03 000235 | 1/1991 |
| RU | 2119570 | 9/1998 |
| RU | 2005104833 | 7/2005 |

* cited by examiner

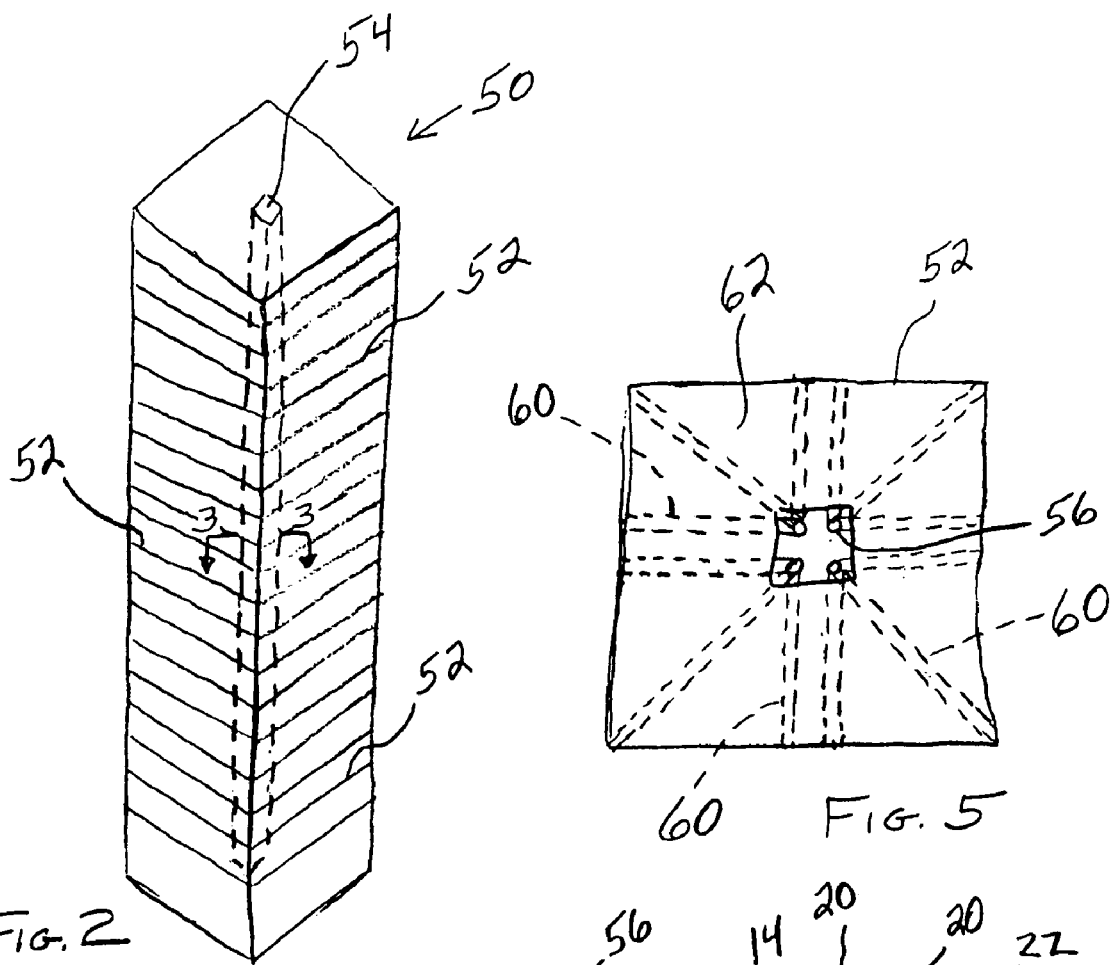
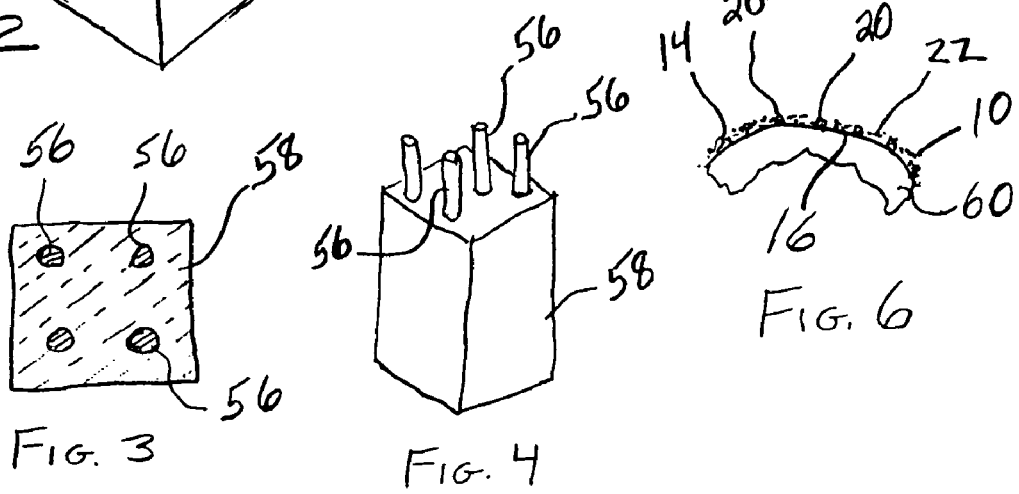

COATINGS AND ADDITIVES CONTAINING CERAMIC MATERIAL

This is a continuation-in-part of co-pending U.S. patent application Ser. No. 09/503,829, filed Feb. 15, 2000 (now U.S. Pat. No. 6,423,129), and priority of U.S. patent application No. 60/159,669, filed Oct. 15, 1999, is claimed.

The present invention relates generally to coatings such as for roofs and for structural supports and additives for various building materials and other applications in the building industry.

On Sep. 11, 2001, the twin towers of the World Trade Center were felled by large fuel-laden commercial aircraft guided into the upper portions thereof. The towers were sufficiently well constructed that the force of impact did not cause the buildings to immediately fall, and they stood for on the order of an hour. However, the tremendous heat from the burning of the jet fuel caused steel supports within the towers to reach temperatures in the range of 800 degrees C. thereby weakening the supports with the result that the towers ultimately collapsed. A structural engineer, Chris Wise, is quoted in "How the World Trade Center Fell," BBC News, Sep. 13, 2001, as follows:

> It was the fire that killed the buildings—nothing on earth could survive those temperatures with that amount of fuel burning.

Each tower had a central core comprising concrete-clad steel beams running vertically there through, and each floor had horizontal steel supports tied to the vertical beams. The concrete cladding on the vertical beams would have provided protection for only a limited time. The horizontal steel supports or beams were covered with fireproofing material, and the fireproofing may or may not have been of sufficient quality to protect the horizontal beams from the heat of the burning jet fuel. However, it is Applicant's understanding that, in the floors near the points of impact, the fireproofing was "blown off" by the forces of impact of the planes thereby exposing the horizontal steel beams to the extreme heat. Thus, as the temperature of the insufficiently protected steel beams approached 800 degrees C., the upper portions of the vertical beams and the horizontal beams in the upper floors began losing structural integrity (weakening) so that upper floors began collapsing onto floors below. Increasingly massive forces were exerted on weakening floors below by the weight of the collapsing floors above, with the result that each of the towers collapsed entirely.

Ceramic or refractory materials are commonly used, among other applications, in the form of blocks as linings of furnaces. When it is necessary to re-line a furnace, the ceramic blocks are removed and typically discarded to a landfill and replaced with new ceramic blocks made from a ceramic material such as alumina oxide, zircon, silica, or magnesia oxide. Sometimes, the ceramic blocks may be recycled by crushing them to form gravel which is then pulverized, and new ceramic blocks made therefrom.

Gunite materials, in the form of high pressure concrete mixes of cement, sand or crushed slag, and water, and the like have been sprayed over reinforcements. Ceramic materials have been used with an adhesive material as coatings and have been used as additives in the building industry. For example, roof cap sheets have been coated with 6 to 20 mesh quartz, and roof composite sheets have been coated with acrylic or alumina oxide in gravel form to protect against the effects of ultraviolet light. Not only are the use of ceramic materials prohibitively expensive but these applications do not adequately protect the roofs from the damaging effects of ultraviolet light since the coatings leave spaces between the ceramic particles through which ultraviolet rays can penetrate to the substrate.

It is accordingly an object of the present invention to provide adequate insulation for steel beams in buildings to withstand the heat encountered by the twin towers and which remains in tact during the type of impact encountered by the twin towers.

It is another object of the present invention to provide a coating for roofs and the like which is effective to protect the substrate from the damaging effects of ultraviolet light so that the roof life may be increased from perhaps 10 years to perhaps 20 to 30 years.

It is another object of the present invention to provide such coatings at a favorable price.

It is a further object of the present invention to provide a coating for wood substrates which provides flame resistance.

It is yet another object of the present invention to provide a coating for steel substrates which provides chemical resistance.

It is still another object of the present invention to provide a ceramic material as an additive to sealants, caulking, and the like to provide improved fire resistance and insulation and other desirable properties but at a favorable price.

In order to provide adequate insulation for steel beams in buildings to withstand the heat encountered by the twin towers and which remains in tact during the type of impact encountered by the twin towers, a coating of ceramic material and an adhesive is applied to the beams.

In order to provide an inexpensive ceramic coating, in accordance with the present invention, the coating is composed of an adhesive and a recycled ceramic material.

In order to provide an inexpensive ceramic additive, in accordance with the present invention, the additive is composed of recycled ceramic material.

In order to provide a ceramic coating which provides effective protection against the effects of ultraviolet light, the coating is composed of an adhesive material and ceramic material comprising ceramic gravel and ceramic powder.

The above and other objects, features, and advantages of the present invention will be apparent in the following detailed description of the preferred embodiment thereof when read in conjunction with the accompanying drawings wherein the same reference numerals denote the same or similar parts throughout the several views.

BRIEF DESCRIPTION OF THE DRAWINGS

FIG. 2 is schematic perspective view of a building which embodies the present invention.

FIG. 3 is a horizontal section view, taken along lines 3-3 of FIG. 2, of a vertical support column, having vertical support members, for the building.

FIG. 4 is a perspective view of a portion of the vertical support column.

FIG. 5 is a plan view of a floor of the building, illustrating horizontal support members as well as the vertical support members therefor.

FIG. 6 is an enlarged fragmentary view of one of the vertical or horizontal support members.

DETAILED DESCRIPTION OF THE PREFERRED EMBODIMENT

Figure 1:
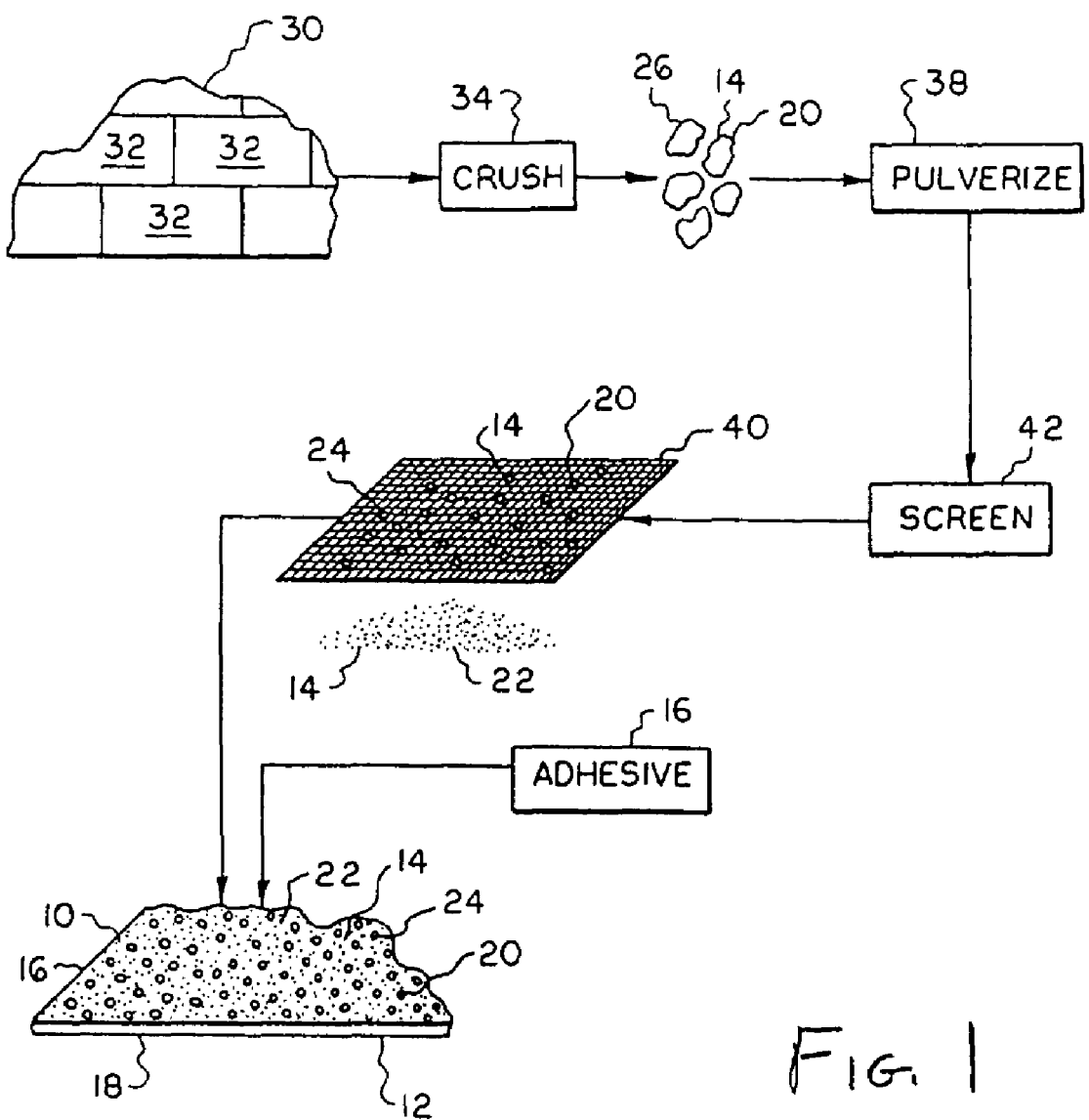
FIG. 1 is a combination block and schematic view illustrating a portion of a roof cap and a method of making thereof which embody the present invention.

Referring to FIG. 1, there is shown at 12 a portion of a roof cap sheet (composed conventionally of fiberglass, asphalt, or other suitable material) to the upper surface of which a coating, illustrated at 10, has been applied. The coating 10 comprises a ceramic material 14 mixed into a suitable adhesive, illustrated at 16, such as, for example, a sodium silicate or mastics or any other suitable adhesive. After the adhesive has hardened, the ceramic material 14 is retained in place on the surface of the substrate 18. Although the substrate 18 is described as a roof cap sheet, it should be understood that it may be any other suitable substrate, such as wood or steel or other metals or concrete, suitable for application of the coating.

For the purposes of this specification and the claims, the term "ceramic" is defined as a refractory material such as used in lining furnaces and for other heat resistance purposes and is meant to include, but is not limited to, alumina oxide (including alumina silica and alloys of alumina such as mullite and alumina containing clays), zircon (including zirconia), silica (both crystalline and amorphous, for example, fume silica, and including alloys of oxides such as alumina and titania with the major phase being silica), and magnesia or periclase (both fused and dead burned and including alloys of magnesia such as dolomite and chrome). Alumina oxide, also known as corundum, is meant to include all naturally occurring and processed alumina, fused, calcined, and tabular and alumina contained in by-products including dust collector fines and sweepings.

Conventional coatings of quartz or other ceramic material of a size on the order of 6 to 20 mesh in an adhesive do not adequately protect the substrate against the damaging effects of ultraviolet radiation due to the large spaces between the portions of ceramic material allowing penetration of ultraviolet rays to the substrate. In order to provide an effective barrier to ultraviolet radiation penetration to the substrate, in accordance with the present invention, the ceramic material is composed of a fine powder ceramic material, illustrated at 22, so as to completely cover the substrate. Preferably, the ceramic material is composed of a coarse granular ceramic material, illustrated at 20, in addition to the powder material 22 in order to provide greater density, increased strength, fire resistance, and insulation as well as a grit appearance. By "powder" is meant, for the purposes of this specification and the claims, a material comprising particles having a size of about 45 mesh or finer or otherwise being of such a small size as to be capable of being suspended in air. The granular material may include particles, illustrated at 24, having a size of around 6 to 30 mesh, or larger pieces of gravel, illustrated at 26, which may have a size of about ⅜ to ½ inch tumbled (to remove rough edges) or discrete pieces of material having any other suitable size suitable for the application. By "granular" is meant, for the purposes of this specification and the claims, particles which have a size greater than about 30 mesh.

In order to apply the coating 10, a layer of adhesive 16 may optionally first be applied to the substrate 18, then the granular particles, which may be either particles 24 or gravel 26 or both, are placed uniformly onto the adhesive, and finally the powder material 22 is uniformly sprayed onto the substrate 18 along with more of the adhesive 16 to thereby fully blanket the substrate with ceramic material, i.e., the ceramic powder is dispersed in the adhesive in a sufficient quantity to provide complete coverage of the portion of the substrate 18 to which the coating 10 is applied, to thereby fully protect against the damaging effects of ultraviolet radiation. Alternatively, both the granular particles 24 and powder material 22 may be sprayed onto the substrate with an adhesive-together (and, if desired, gravel 26 laid loosely onto the substrate before spraying), or other suitable means may be used to apply the coating 10. Such a coating may be applied to roofing shingles, roof cap sheets, or composite roofing sheets at the factory or in the field. As a result, such a solid ceramic roof may have a much longer life, perhaps 20 to 30 years instead of 10 years, be uniform for improved appearance and with no exposed joints, and, also advantageously, it is unnecessary to use hot asphalt. Further, the coating 10 may be sprayed on quickly to save labor costs.

Other construction materials may be similarly coated in order to provide ultraviolet radiation protection, heat insulation (resistance to heat), as described hereinafter in greater detail with reference to FIGS. 2 to 6, or other forms of protection. Thus, wood structures may be coated with a suitable number of coats of the coating 10 to add insulation value and to prevent flame from breaking down the wood and thus provide a better fire rating to a structure. Steel or other metallic structures such as steel piping and metal roof decks may be coated with the coating 10 to provide chemical resistance (as well as corrosion and ultraviolet radiation). The coating 10 may be applied to the top of decks for insulation value and to the bottom thereof for fire resistance. The coating may be applied to flashings (to stabilize corners) to provide an improved appearance and better fire ratings as well as to save the time and labor required in otherwise preparing the flashings conventionally, i.e., one need only spray on the coating 10 and "walk away" to do other work. Various other uses for the coating 10 may be found in the construction trades, and such other uses are meant to come within the scope of the present invention.

More and more, it is being demanded that insulation R values be raised from 15 up to 30. However, it has been difficult to do so due to the undesirably increased thickness of conventional insulation. The coating of the present invention advantageously allows the insulation thickness to remain relatively thin (on the order of 60 mils).

Referring to FIGS. 2 to 6, there is shown generally at 50 a building which, like the twin towers of the World Trade Center, has a plurality of floors, illustrated at 52. A central support core 54 runs vertically through the building 50. The core 54 includes a plurality of vertical steel supports or beams 56 encased in concrete cladding or covering 58. Each of the floors 52 has a plurality of horizontal steel supports or beams 60 each suitably tied to one of the vertical beams 56 such as, for example, by welding or bolting to brackets (not shown) attached to the vertical beams. The floors 52 are finished therefrom in accordance with principles commonly known to those of ordinary skill in the art to which the present invention pertains.

FIG. 6 shows a fragment of one of the horizontal supports 60. In order to provide adequate insulation to protect the support 60 from weakening at the extreme heat encountered in the twin towers collapse and to prevent the insulation from becoming blown off or otherwise removed during a high impact such as experienced by the twin towers, in accordance with the present invention, the support 60 is provided with the coating 10 of ceramic material 14 (which may provide fireproofing up to about 4,000 degrees F.) and the adhesive 16 so as to provide a hard coat which does not easily come off. The ceramic material 14 preferably includes the granular particles 20 overcoated with the powder material 20 so as to provide uniformity at less cost. The vertical beams 56 and/or the concrete cladding 58 as well as other structural supports in the building 50 may be similarly coated.

The ceramic material 14 may also be provided as an additive to various construction materials to enhance the properties thereof. Thus, the ceramic material 14 may be added to, for example, sealants (for example, for sealing of concrete floors, walls, and ceilings), stucco, and caulking to provide fire resistance, insulation value, and increased strength. The ceramic material additive 14 may comprise the powder 22 or, if desired to provide a grit look as well as increased strength, fire resistance, and insulation, granular particles 20 in addition to or instead of the powder.

New ceramic materials are too expensive for practical and competitive application in the construction industry as described above. However, ceramic materials are commonly discarded to landfills. Thus, by recycling the used ceramic materials for use in the coatings and additives of the present invention, the cost may be substantially reduced so that it is practical and competitive while providing an improved product. Therefore, in accordance with a preferred embodiment of the present invention, the ceramic material 14 is recycled, i.e., formed or collected from ceramic material which has been previously used for any purpose such as the lining of furnaces. Thus, illustrated at 30 is a portion of a wall of a furnace which contains blocks 32 of ceramic material. From time to time, the furnace must be re-lined with the result that the blocks 32 are removed. The removed used blocks 32 are typically obtainable at no cost except transportation costs. In order to recycle the blocks 32, they may first be placed in a conventional jaw crusher, as illustrated at 34, to compress and shatter them to thereby form the gravel 26. The gravel 26 is then placed in a conventional pulverizer, as illustrated at 38, to form a mixture of the granular particles 24 and the powder 22. The granular particles 24 and the powder 22 are then separated by use of a screen 40, as illustrated at 42, of a size wherein the powder 22 falls through the screen 40 and the granular particles 24 do not fall through the screen 40. This inexpensive process for recycling the ceramic material is conventional in the art for the purpose of providing ceramic blocks for lining of furnaces and allows the ceramic material to be provided inexpensively. However, any other suitable process for recycling the ceramic material may be used.

The use of the inexpensive recycled ceramic material in the coatings and additives of the present invention allows its use to be sufficiently inexpensive as to be practical and competitive in the building industry (while providing superior building structures) while also helping to preserve the environment.

It should be understood that, while the present invention has been described in detail herein, the invention can be embodied otherwise without departing from the principles thereof, and such other embodiments are meant to come within the scope of the present invention as defined by the appended claims.

What is claimed is:

1. A method of imparting heat and impact resistance to a building comprising applying an adhesive to at least one floor-supporting beam for the building and dispersing ceramic material in the adhesive and thereafter allowing the adhesive to harden thereby retaining the ceramic material adhesively on a surface of the at least one beam.

2. A method according to claim 1 further comprising selecting the at least one beam to be composed of steel.

3. A method according to claim 1 further comprising selecting the at least one beam to be composed of metal.

4. A method according to claim 1 further comprising selecting the ceramic material to be processed from used ceramic material.

5. A method according to claim 1 further comprising selecting the ceramic material to be processed from used furnace lining.

6. A method according to claim 1 further comprising selecting the ceramic material to comprise granular ceramic material and ceramic powder, and dispersing the ceramic powder in the adhesive in a sufficient quantity to provide complete coverage with ceramic material of at least a portion of the at least one beam to which the ceramic coating is applied.

7. A method of imparting ultraviolet light protection to a roof portion for a building, the method comprising applying an adhesive to roofing sheets for the roof portion and dispersing ceramic material in the adhesive and thereafter allowing the adhesive to harden thereby retaining the ceramic material adhesively on surfaces of the roofing sheets, wherein the step of dispersing the ceramic material in The adhesive includes dispersing ceramic powder in the adhesive in a sufficient quantity to provide complete coverage with the ceramic material of the roofing sheets.

8. A method according to claim 7 further comprising selecting the ceramic material to be processed from used ceramic material.

9. A method according to claim 7 further comprising selecting the ceramic material to be processed from used furnace lining.

10. A method according to claim 7 wherein the step of dispersing the ceramic material in the adhesive further includes dispersing granular ceramic material in the adhesive.

11. A method of imparting heat and impact resistance to a building comprising applying an adhesive to at least one supporting beam for the building and dispersing ceramic material in the adhesive and thereafter allowing the adhesive to harden thereby retaining the ceramic material adhesively on a surface of the at least one supporting beam, wherein the step of dispersing the ceramic material in the adhesive includes dispersing ceramic powder in the adhesive in a sufficient quantity to provide complete coverage with the ceramic material of at least a portion of the at least one supporting beam to which the ceramic coating is applied.

12. A method according to claim 11 further comprising selecting the granular ceramic material and the ceramic powder to be processed from used furnace lining.

13. A method according to claim 11 further comprising selecting the granular ceramic material and the ceramic powder to be processed from used ceramic material.

14. A material used in construction, the material being one of a sealant, stucco, and caulking, the material including an additive comprising a quantity of ceramic material, wherein said ceramic material is made from used furnace lining.

15. A material according to claim 14 wherein said ceramic material comprises ceramic powder.

16. A material according to claim 14 wherein said ceramic material further comprises granular ceramic material.

17. A method of enhancing at least one of the properties of fire resistance, insulation value, and strength of a material used in construction comprising applying to the material a quantity of ceramic material which is made from used furnace lining.

18. A method according to claim 17 further comprising selecting the ceramic material to include ceramic powder.

19. A method according to claim 17 wherein the material is one of a sealant, stucco, and caulking.

* * * * *